July 22, 1941.	D. BERQUIST	2,250,349
LUBRICATING DEVICE
Filed Sept. 12, 1939
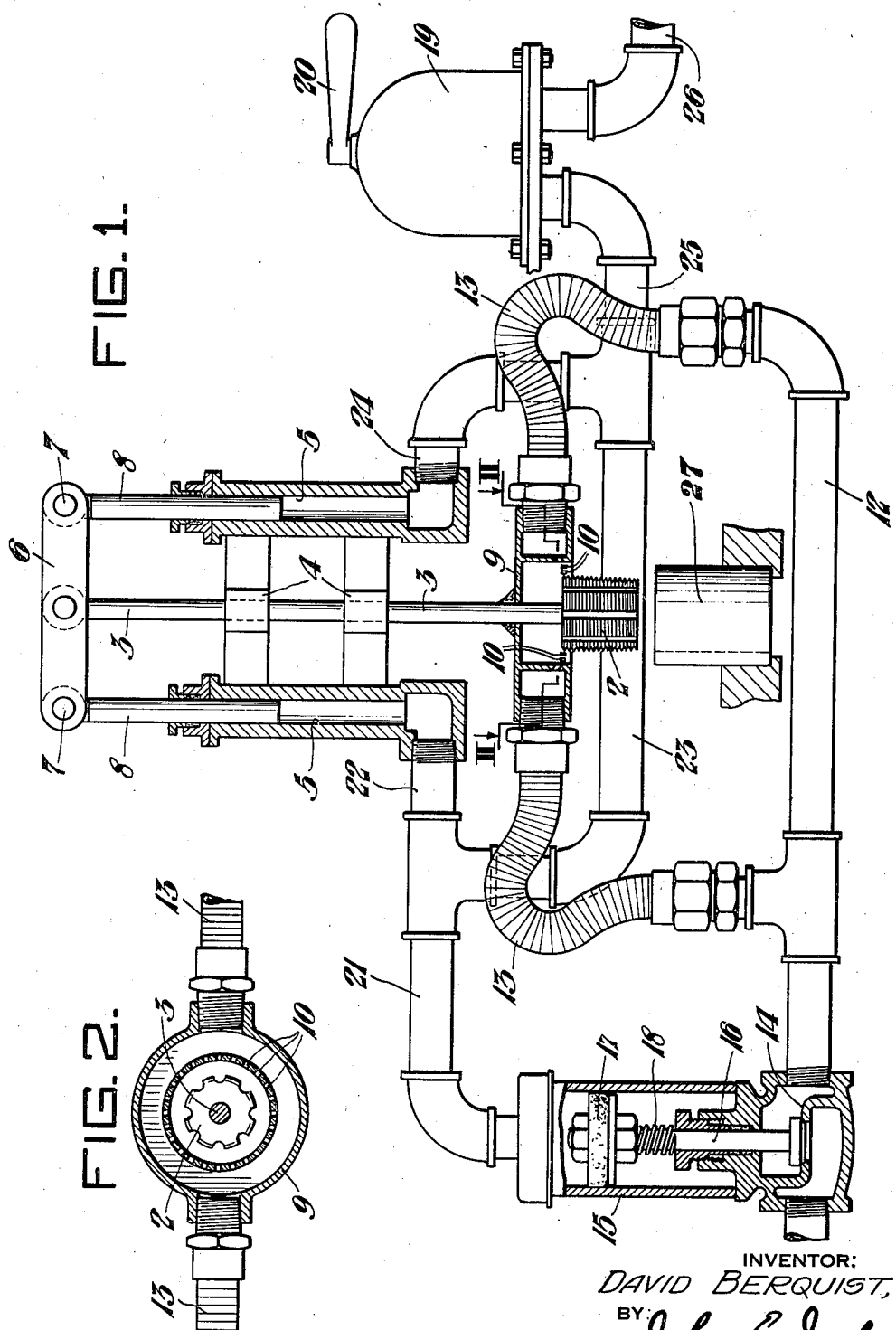
INVENTOR:
DAVID BERQUIST,
BY John E. Jackson
HIS ATTORNEY.

Patented July 22, 1941

2,250,349

UNITED STATES PATENT OFFICE 2,250,349

LUBRICATING DEVICE

David Berquist, McKeesport, Pa., assignor to National Tube Company, a corporation of New Jersey Application September 12, 1939, Serial No. 294,551

8 Claims. (Cl. 10—106)

This invention relates to a lubricating device, and particularly to an improved lubricating device for use with tapping machines and the like.

Various types of lubricating devices or means have been suggested and used in connection with lathes, tapping and threading machine, drill presses and the like, for supplying a lubricant to the cutting tool therein during the cutting operation so as to prevent the cutting tool and work-piece from becoming overheated and to produce a much better and a more accurate cutting job and finished product. Most of the heretofore suggested and used devices provided a continuous flow of the lubricant to the cutting tool and work-piece and were controlled by a valve which had to be manually turned on at the beginning of the operation and manually turned off at the completion of the cutting operation which was not only inconvenient, but troublesome in that it diverted the operator's attention from the machine, and, oftentimes the operator would carelessly adjust the lubricant spraying nozzle relative to the cutting tool and work-piece while the machine and cutting tool were in motion which, of course, was extremely dangerous.

In the present invention, the lubricant spraying nozzle is always properly positioned relative to the cutting tool and work-piece and the supply of the lubricant thereto is automatically controlled, thereby eliminating the above named disadvantages and hazards.

Accordingly, it is one of the objects of the present invention to provide an improved lubricant device or means for tapping machines and the like which operates automatically to control the flow of the lubricant to the cutting tool and work-piece.

It is another object of the invention to provide an improved lubricating device or means for tapping machines and the like which is simple and inexpensive in its construction and, yet, one which is very effective in its use.

It is another object of the invention to provide an improved lubricating device for tapping machines and the like which requires the least amount of attention from the operator and one which consumes a minimum amount of lubricating liquid.

Various other objects and advantages of this invention will become more apparent in the course of the following specification and will be particularly pointed out in the appended claims.

In the accompanying drawing there is shown, for the purpose of illustration and description, one embodiment which my invention may assume in practice.

In the drawing:

Figure 1 is an elevation partly in section of the improved lubricating device of my invention, and Figure 2 is a sectional view taken on line II—II of Figure 1.

The improved lubricating device or means of the present invention is shown incorporated with a tap of tapping machine merely for the purpose of illustration as it will be understood that it may be employed on lathes, boring and threading machine, drill presses or similar pieces of cutting equipment.

Referring more particularly to the drawing, there is shown a tap 2 having a shank 3 reciprocably mounted in a rigid guiding support 4 which may be part of the tapping machine. There is mounted, preferably on the rigid support 4, twin air cylinders 5 with one arranged at each side of the tap shank 3. On the outer end of the tap shank 3, there is pivotally arranged intermediate its length, a beam member 6 having its outer ends pivotally attached at 7 to the ends of the pistons 8 of the twin air cylinders 5.

There is concentrically arranged around the tap 2 adjacent the top thereof, and securely attached to the shank 3, preferably by means of welding, an annular nozzle member 9 having a plurality of orifices or jets 10 arranged therearound on the lower inner wall thereof, and disposed preferably at an angle of about 60 degrees so as to direct the lubricant downwardly against the side of the tap.

The nozzle member 9 is connected to the end of a lubricant supply pipe line 12, preferably by means of a pair of flexible hose connections 13 which are connected to the nozzle member preferably at diametrically opposed sides thereof.

There is disposed in the lubricant supply pipe line 12 an automatically controlled valve 14 having an air cylinder 15 associated therewith for actuating the same. On the outer end of the reciprocating valve stem 16 of the valve 14 in the air cylinder 15, there is arranged a piston member 17 and there is disposed around the valve stem in the air cylinder between the piston member 17 and the valve 14, a compression coil spring 18.

The outer end of the air cylinder 15 and the inner ends of the twin air cylinders 5 are interconnected and both are commonly connected to a control valve 19 having a manipulating handle 20, preferably by means of pipes 21, 22, 23, 24 and 25, and the control valve 19 is connected to an air pressure supply line 26.

The improved lubricating device of the present invention operates as follows: At the start of the cutting operation the control valve 19 is set so that air pressure enters from the line 26 into the connections 21, 22, 23, 24 and 25, thereby forcing the piston member 17 together with the valve stem 16 in the air cylinder 15 inwardly against the action of the coil spring 18, keeping the valve 14 closed and forcing the pistons 8 in the twin cylinders 5 outwardly to retain the tap 2 in its retracted position, as shown in Figure 1.

The tapping machine is then set in operation so that the coupling 27 or other piece to be worked upon by the tap revolves. The control valve 19 is then set by means of the handle 20 so that the air exhausts to the atmosphere from above the piston in the air cylinder 15, and from below the plungers 8 of the cylinders 5, permitting the tap to enter the work-piece and thereby permitting the valve 14 to open due to the action of the spring 18 and allowing the lubricant to pass therethrough to the nozzle member 9 by means of the flexible hose connections 13 so as to issue from the orifices or jets 10 therein over the outer surface of the tap and coupling or other work-piece. The tap is then moved forwardly into engagement with the coupling and the cutting operation continued.

At the completion of the cutting operation, the control valve 19 is again set so that air pressure enters the interconnecting pipe lines 21, 22, 23, 24 and 25, thereby forcing the piston downwardly in the air cylinder 15 against the action of the spring 14, thereby closing the valve 14 and stopping the flow of the lubricant to the nozzle member 9, and, simultaneously, forcing the pistons 8 in the twin air cylinders 5 outwardly, thereby moving the tap 2 away from the coupling or work-piece to its retracted position.

It will be understood that oil or any other suitable lubricating liquid can be used as the lubricant in the lubricating device of this invention.

As a result of this invention, it will be seen that the cutting tool and the entire inner surface of the coupling or other work-piece is bathed in the oil or lubricant during the cutting operation and that the pressure of the oil or lubricant will tend to force the chips from the work-piece, thereby keeping the working surface clean of foreign material throughout the cutting operation.

While I have shown and described one embodiment of my invention, it will be understood that this embodiment is merely for the purpose of illustration and description and that various other forms may be devised within the scope of my invention, as defined in the appended claims.

I claim:

1. In a lubricating device for tapping machines and the like, the combination with a non-rotatable reciprocating cutting tool and a rigidly mounted guiding support therefor, of a nozzle securely mounted on said cutting tool so as to move with the same in its reciprocating movement and adapted to supply a continuous stream of a lubricant to the outer surface of said cutting tool and the work-piece during the cutting operation, a lubricant supply line for supplying the lubricant to said nozzle, a valve disposed in said lubricant supply line, means for actuating said valve to open the same to supply the lubricant to the nozzle and to simultaneously move the cutting tool forwardly into engagement with the work-piece, and means for moving the cutting tool away from the work-piece to its retracted position after the cutting operation and for simultaneously closing said valve to stop the supply of the lubricant to the nozzle.

2. In a lubricating device for tapping machines and the like, the combination with a reciprocating cutting tool and a rigidly mounted guiding support therefor, of an annular non-rotatable nozzle concentrically arranged around the cutting tool, said nozzle being movably mounted so as to move simultaneously with the reciprocating movement of the cutting tool, and means connected to said nozzle for supplying a continuous stream of a lubricant to the outer surface of the cutting tool and the work-piece only during the cutting operation, and automatically controlled means arranged with said last mentioned means for controlling the supply of the lubricant therethrough to said nozzle.

3. In a lubricating device for tapping machines and the like, the combination with a non-rotatable reciprocating cutting tool and a rigidly mounted guiding support therefor, of an annular nozzle concentrically arranged around the cutting tool, said nozzle being movably mounted so as to move simultaneously with the reciprocating movement of the cutting tool and adapted to supply a continuous stream of a lubricant to the outer surface of the cutting tool and the work-piece only during the cutting operation, a lubricant supply line for supplying the lubricant to said nozzle, a valve disposed in said line, means for actuating said valve to open the same when the cutting tool is moved forwardly and engaged with the work-piece during the cutting operation, and means for closing the valve when the cutting tool is retracted from the work-piece after the cutting operation.

4. In a lubricating device for tapping machines and the like, the combination with a reciprocating cutting tool and a rigidly mounted guiding support therefor, of an annular nozzle concentrically arranged around the cutting tool, said nozzle being movably mounted so as to move simultaneously with the reciprocating movement of the cutting tool and adapted to supply a continuous stream of a lubricant to the outer surface of the cutting tool and the work-piece only during the cutting operation, a lubricant supply line for supplying the lubricant to said nozzle, a valve disposed in said line, an air cylinder associated with said valve for actuating the same, means for actuating said air cylinder to open the valve to supply the lubricant to the nozzle when the cutting tool is moved forwardly and engaged with the work-piece during the cutting operation, and means for actuating the air cylinder so as to close the valve when the cutting tool is retracted from the work-piece after the cutting operation.

5. In a lubricating device for tapping machines and the like, the combination with a reciprocating cutting tool and a rigidly mounted guiding support therefor, of an annular nozzle concentrically arranged around the cutting tool, said nozzle being movably mounted so as to move simultaneously with the reciprocating movement of the cutting tool and adapted to supply a continuous stream of a lubricant to the outer surface of the cutting tool and the work-piece only during the cutting operation, a lubricant supply line for supplying the lubricant to said nozzle, a valve disposed in said line, an air cylinder associated with said valve for actuating the same, a piston disposed on the outer end of the valve stem of said valve, a compression spring arranged around said valve stem between the piston and said valve, means for supplying air pressure to said air cylinder above the piston therein so as to force the same inwardly to close the valve against the action of said spring thereby loading the same, and means for releasing the air pressure above the piston in said air cylinder so that the piston together with the valve stem will be forced outwardly due to the action of said spring thereby opening the valve.

6. In a lubricating device for tapping machines and the like, the combination with a reciprocating cutting tool and a rigidly mounted guiding support therefor, of an annular nozzle concentrically arranged around the cutting tool, said nozzle being movable mounted so as to move simultaneously with the reciprocating movement of the cutting tool and adapted to supply a continuous stream of a lubricant to the outer surface of the cutting tool and the work-piece only during the cutting operation, a lubricant supply line for supplying the lubricant to said nozzle, a valve disposed in said line, an air cylinder associated with said valve for actuating the same, means for actuating said air cylinder to open the valve to supply the lubricant to the nozzle when the cutting tool is moved forwardly and engaged with the work-piece during the cutting operation, a pair of air cylinders associated with said cutting tool, and means for supplying air pressure to the pair of air cylinders associated with said cutting tool and to the air cylinder associated with said valve so that the air pressure will move the cutting tool away from the work-piece to its retracted position after the cutting operation and simultaneously close the valve to stop the supply of the lubricant to the nozzle.

7. In a lubricating device for tapping machines and the like, the combination with a non-rotatable reciprocating cutting tool and a rigidly mounted guiding support therefor, of an annular nozzle member arranged concentrically around said cutting tool and being securely attached thereto so as to move with said tool in its reciprocating movement and adapted to supply a continuous stream of a lubricant to the outer surface of said cutting tool and the work-piece during the cutting operation, controllable means for supplying a lubricant to said nozzle, and means for moving said cutting tool away from the work-piece to its retracted position after the cutting operation and simultaneously actuating said controllable means to stop the flow of the lubricant to said nozzle.

8. In a lubricating device for tapping machines and the like, the combination with a reciprocating cutting tool and a rigidly mounted guiding support therefor, of a nozzle arranged adjacent said cutting tool, said nozzle being movably mounted so as to move simultaneously with the reciprocating movement of the cutting tool and adapted to supply a continuous stream of a lubricant to the outer surface of the cutting tool and the work-piece during the cutting operation, a lubricant supply line for supplying the lubricant to said nozzle, a valve disposed in said line, an air cylinder associated with said valve for actuating the same, means for actuating said air cylinder to open the valve to supply the lubricant to the nozzle and to simultaneously move the cutting tool forwardly into engagement with the work-piece and means for actuating the air cylinder so as to close the valve and to simultaneously move the cutting tool to a retracted position away from the work-piece after the cutting operation.

DAVID BERQUIST.